(12) United States Patent
Squier et al.

(10) Patent No.: US 10,040,146 B2
(45) Date of Patent: Aug. 7, 2018

(54) INTEGRATED SINGLE GRATING COMPRESSOR FOR VARIABLE PULSE-FRONT TILT IN SIMULTANEOUSLY SPATIALLY AND TEMPORALLY FOCUSED SYSTEMS

(71) Applicant: Colorado School of Mines, Golden, CO (US)

(72) Inventors: Jeff A. Squier, Golden, CO (US); Erica K. Block, Golden, CO (US)

(73) Assignee: COLORADO SCHOOL OF MINES, Golden, CO (US)

(*) Notice: Subject to any disclaimer, the term of this patent is extended or adjusted under 35 U.S.C. 154(b) by 229 days.

(21) Appl. No.: 14/968,633

(22) Filed: Dec. 14, 2015

(65) Prior Publication Data

US 2016/0170217 A1 Jun. 16, 2016

Related U.S. Application Data

(60) Provisional application No. 62/091,394, filed on Dec. 12, 2014.

(51) Int. Cl.
*B23K 26/362* (2014.01)
*G01B 11/00* (2006.01)
*H01S 3/00* (2006.01)
*H01S 3/23* (2006.01)

(52) U.S. Cl.
CPC ............ *B23K 26/362* (2013.01); *G01B 11/00* (2013.01); *H01S 3/0057* (2013.01); *H01S 3/2325* (2013.01)

(58) Field of Classification Search
CPC ................................ G02B 7/18; B23K 26/362
See application file for complete search history.

(56) References Cited

PUBLICATIONS

Akturk et al. (Pulse-front tilt caused by spatial and temporal chirp, Optics Express vol. 12, No. 19, pp. 4399-4410, Sep. 20, 2004).*
O'Shea et al. (Highly simplified device for ultrashort-pulse measurement, Optics Letters vol. 26, No. 12, pp. 932-934, Jun. 15, 2001).*
Sacks et al. (Adjusting pulse-front tilt and pulse duration by use of a single-shot autocorrelator, Optics Letters vol. 26, No. 7, pp. 462-464, Apr. 1, 2001).*
Block et al. "Simultaneous spatial and temporal focusing for tissue ablation." Biomedical Optics Express, Jun. 2013, vol. 4, No. 6, pp. 831-841.

(Continued)

*Primary Examiner* — Kimberly N Kakalec
(74) *Attorney, Agent, or Firm* — Sheridan Ross PC

(57) ABSTRACT

A multipass chirped pulse amplification system outfitted with a single-grating, simultaneous spatial and temporal focusing (SSTF) compressor platform is provided. Such a system provides the ability to vary the beam aspect ratio of an SSTF beam, and thus the degree of pulse-front tilt at a focus, while maintaining a net zero-dispersion system. The optical system may include a first optical element or set of optical elements that receives and then varies a pulse-front tilt of a light beam, and a second optical element or set of optical elements that focuses the light beam having the varied pulse-front tilt that is output by the first optical element or set of optical elements. The first optical element or set of optical elements includes an optical grating, two dihedrals, and a retroflector roof mirror.

16 Claims, 5 Drawing Sheets

(56) References Cited

PUBLICATIONS

Block et al. "Integrated single grating compressor for variable pulse front tilt in simultaneously spatially and temporally focused systems," Optics Letters, Dec. 2014, vol. 39, No. 24, pp. 6915-6918.

Durfee et al. "Intuitive analysis of space-time focusing with double-ABCD calculation," Optics Express, Jun. 2012, vol. 20, No. 13, pp. 14244-14259.

Durst et al. "Simultaneous spatial and temporal focusing for axial scanning," Optics Express, Dec. 2006, vol. 14, No. 25, pp. 12243-12254.

Durst et al. "Simultaneous spatial and temporal focusing in non-linear microscopy," Optics Communications, 2008, vol. 281, pp. 1796-1805.

He et al. "Fabrication of microfluidic channels with a circular cross section using spatiotemporally focused femtosecond laser pulses," Optics Letters, Apr. 2010, vol. 35, No. 7, pp. 1106-1108 (Abstract Only).

Kammel et al. "Enhancing precision in fs-laser material processing by simultaneous spatial and temporal focusing," Light: Science & Applications, May 2014, vol. 3, e169, 8 pages.

Kazansky et al. "'Quill' writing with ultrashort light pulses in transparent materials," Applied Physics Letters, 2007, vol. 90, 151120, 4 pages.

Oron et al. "Scanningless depth-resolved microscopy," Optics Express, Mar. 2005, vol. 13, No. 5, pp. 1468-1476.

Osvay et al. "Angular Dispersion and Temporal Change of Femtosecond Pulses From Misaligned Pulse Compressors," IEEE Journal of Selected Topics in Quantum Electronics, Jan.-Feb. 2004, vol. 10, No. 1, pp. 213-220.

Poumellec et al. "Non reciprocal writing and chirality in femtosecond laser irradiated silica," Optics Express, Oct. 2008, vol. 16, No. 22, pp. 18354-18361.

Salter et al. "Dynamic control of directional asymmetry observed in ultrafast laser direct writing," Applied Physics Letters, 2012, vol. 101, 141109, 4 pages.

Squier et al. "High average power Yb:CaF2 femtosecond amplifier with integrated simultaneous spatial and temporal focusing for laser material processing," Appl Phys A Mater Sci Process, Jan. 2014, vol. 114, No. 1, pp. 209-214.

Sugioka et al. "Efficient microwelding of glass substrates by ultrafast laser irradiation using a double-pulse train," Optics Letters, Jul. 2011, vol. 36, No. 14, pp. 2734-2736 (Abstract only).

Sun et al. "Effects of aberrations in spatiotemporal focusing of ultrashort laser pulses," Journal of the Optical Society of America A, Apr. 2014, vol. 31, No. 4, pp. 765-772 (Abstract Only).

Tamaki et al. "Welding of Transparent Materials Using Femtosecond Laser Pulses," Japanese Journal of Applied Physics, May 2005, vol. 44, Part 2, Nos. 20-23, L687 (Abstract Only).

Tamaki et al. "Laser micro-welding of transparent materials by a localized heat accumulation effect using a femtosecond fiber laser at 1558 nm," Optics Express, Oct. 2006, vol. 14, No. 22, pp. 10460-10468.

Thomas et al. "Simultaneously spatially and temporally focusing light for tailored ultrafast micro-machining," SPIE Proceedings, Mar. 2014, vol. 8972, 2 pages (Abstract Only).

Treacy "Optical pulse compression with diffraction gratings," IEEE Journal of Quantum Electronics, Sep. 1969, vol. 5, No. 9, pp. 454-458 (Abstract only).

Vitek et al. "Spatio-temporally focused femtosecond laser pulses for nonreciprocal writing in optically transparent materials," Optics Express, Nov. 2010, vol. 18, No. 24, pp. 24673-24678.

Vitek et al. "Temporally focused femtosecond laser pulses for low numerical aperture micromachining through optically transparent materials," Optics Express, Aug. 2010, vol. 18, No. 17, pp. 18086-18094.

Watanabe et al. "Space-selective laser joining of dissimilar transparent materials using femtosecond laser pulses," Applied Physics Letters, Jul. 2006, vol. 89, No. 2, 0211106 (Abstract Only).

Watanabe et al. "Direct joining of glass substrates by 1 kHz femtosecond laser pulses," Applied Physics B, Mar. 2007, vol. 87, Article 85 (Abstract Only).

Weiner "Ultrafast Optics," John Wiley & Sons, Inc. © 2009, Hoboken, New Jersey, 596 pages.

Yang et al. "Unltrashort-pulse laser calligraphy," Applied Physics Letters, Oct. 2008, vol. 93, No. 17, 11709.

Zhu et al. "Simultaneous spatial and temporal focusing of femtosecond pulses," Optics Express, Mar. 2005, vol. 13, No. 6, pp. 2153-2159.

\* cited by examiner

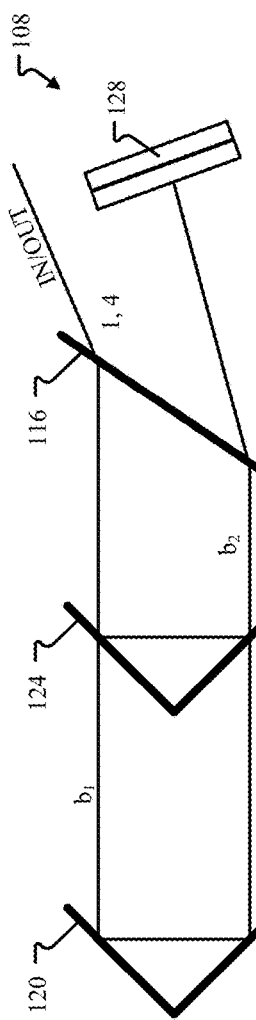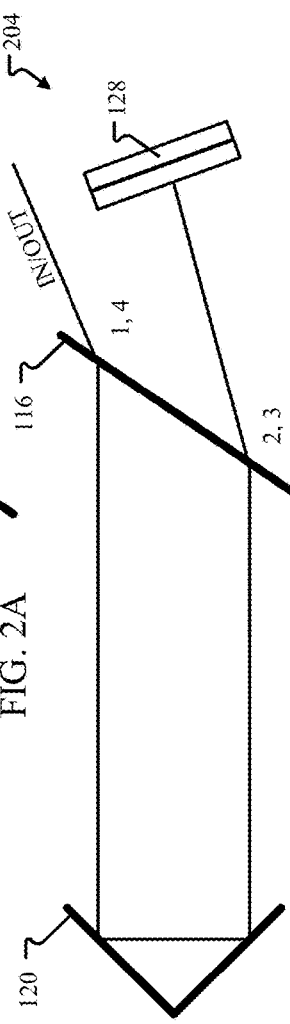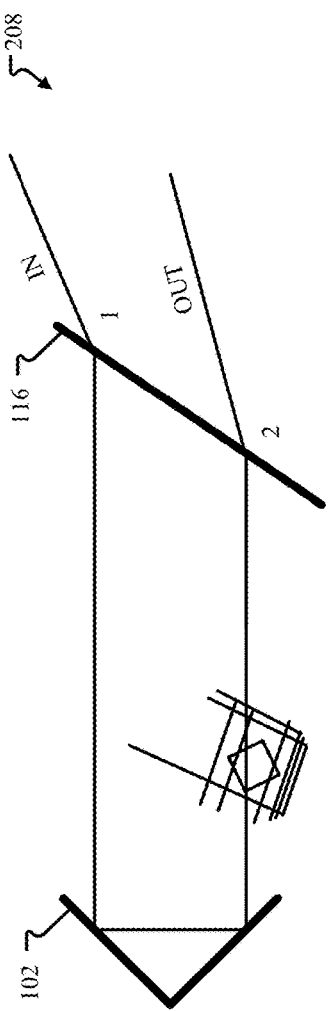

INTEGRATED SINGLE GRATING COMPRESSOR FOR VARIABLE PULSE-FRONT TILT IN SIMULTANEOUSLY SPATIALLY AND TEMPORALLY FOCUSED SYSTEMS

CROSS-REFERENCE TO RELATED APPLICATIONS

This Application claims the benefit and priority of U.S. Provisional Application No. 62/091,394, filed Dec. 12, 2014, the entire disclosure of which is hereby incorporated herein by reference.

GOVERNMENT LICENSE RIGHTS

This invention was made with government support under grants EB003832 awarded by the National Institutes of Health and FA9550-10-D-0561 awarded by the Air Force Office of Scientific Research. The government has certain rights in the invention.

FIELD OF THE DISCLOSURE

The disclosure is related to an apparatus and method for varying a beam aspect ratio of a simultaneous spatial temporal focusing (SSTF) beam, and thus the degree of pulse-front tilt at focus.

BACKGROUND

The utility of simultaneous spatio-temporal focusing (SSTF) is gaining enthusiasm and has begun to be exploited in the field of microfluidic devices and micromachining for its ability to support large focal volumes and long working distances while mitigating nonlinear effects. Additionally, the highly localized nature of an SSTF beams' axial intensity has proved to be an optimal tool for precision tasks such as (1) the ablation of ocular tissue and localized breakdown in water with low numerical aperture beams and (2) the minimization of out-of-focus background excitation in nonlinear microscopy. A direct result of the SSTF scheme is intrinsic pulse-front tilt (PFT), a phenomenon where the arrival time of a pulse varies across the beam at focus due to spatial chirp. Optical elements inducing angular dispersion, such as a diffraction grating or prism, will result in PFT. It has been experimentally shown that PFT offers yet another degree of freedom for machining in addition to laser parameters (such as repetition rate, pulse duration, pulse energy, and wavelength), innate material properties, and the numerical aperture (NA) of the beam. More specifically, PFT gives rise to nonreciprocal writing, in which induced material modifications are dependent on the scan direction relative to the PFT.

Tuning PFT in a classical laser machining setup architecture however is cumbersome and is not a practical tool for continuous machining. Having the freedom to continuously tune the PFT in a simple manner and in a way that could be automated would broaden the capability and expand the applicability of femtosecond laser micromachining. Additionally, while the use of spatially-chirped beams has resulted in intriguing applications as described above, comparison across different groups has been complicated by the number of techniques used to create the spatial chirp (and thereby PFT). In earlier work, PFT was realized by imposing misalignment within a laser's grating compressor. (See for example, K. Osvay et al., "Angular Dispersion and Temporal Change of Femtosecond Pulses From Misaligned Pulse Compressors," IEEE Journal of Selected Topics in Quantum Electronics 10, 213-220 (2004), the entire disclosure of which is hereby incorporated herein by reference for all that it teaches and for all purposes.) These misalignments are difficult to quantify because of the number of degrees of freedom involved. Introducing a grating angular mismatch of the gratings leads to angular spatial chirp and adjusting the retroreflection mirrors in a double-pass grating pair leads to transverse spatial chirp. A second technique in use is where a single grating is effectively imaged to the target, where the angularly dispersed frequency components cross. This configuration has applications in imaging, but is not ideal for micromachining because the spatial and temporal focal planes are typically not overlapped. That is, the Gaussian waist of the frequency dispersed beamlets and the location where the beamlets cross may not occur at the same point. SSTF may provide precise control over PFT by using a single-pass grating compressor configuration. (See, for example, Vitek, D. N., Block, E., Bellouard, Y., Adams, D. E., Backus, S., Kleinfeld, D., . . . Squier, J. A. (2010). Spatio-temporally focused femtosecond laser pulses for nonreciprocal writing in optically transparent materials. Optics Express, 18(24), 24673-24678; Vitek, D. N., Adams, D. E., Johnson, A., Tsai, P. S., Backus, S., Durfee, C. G., . . . Squier, J. A. (2010). Temporally focused femtosecond laser pulses for low numerical aperture micromachining through optically transparent materials. Optics Express, 18(17), 18086-18094; and Block, E., Greco, M., Vitek, D., Masihzadeh, O., Ammar, D. A., Kahook, M. Y., . . . Squier, J. (2013). Simultaneous spatial and temporal focusing for tissue ablation. Biomedical Optics Express, 4(6), 831-841, the entire disclosures of which are hereby incorporated herein by reference for all that they teach and for all purposes.) This setup however is inefficient and unnecessarily convoluted since a secondary SSTF grating compressor is added in conjunction with a complete chirped pulse amplification (CPA) system.

SUMMARY

In one aspect of the present invention, a multipass chirped pulse amplification system is outfitted with a single-grating, simultaneous spatial and temporal focusing (SSTF) compressor platform. Such an embodiment has the ability to easily vary the beam aspect ratio of an SSTF beam, and thus the degree of pulse-front tilt at focus, while maintaining a net zero-dispersion system. Accessible variation of pulse-front tilt gives full spatio-temporal control over the intensity distribution at the focus and provides an enhanced understanding of other effects, such as nonreciprocal writing and SSTF-material interactions.

In this configuration, the PFT results from the geometry of the gratings and the focusing optic, so the PFT can be precisely controlled, and can be routinely achieved across different systems while maintaining a spatially diffraction-limited, and temporally transform-limited focus. Since the beamlets (each frequency component can be treated as its own Gaussian beamlet) are collimated and parallel to each other, there is no transverse chirp at the focal plane. This leads to a coincidence of the temporal and spatial focus. The PFT results from the angular spatial chirp rate.

Accordingly, an optical system design that offers the ability to smoothly vary the PFT may find use in the micromachining and nonreciprocal writing arenas where PFT provides yet another degree of freedom for material modification based on scan direction. For example, such an optical system may be utilized in applications requiring no PFT, such as filamentation-based glass-to-glass bonding. Such optical system, and more particularly, the flexibility of a compressor design, may allow for both applications to be realized efficiently with a single system and result in uniquely structured and sealed lab on a chip type devices. In addition, the second-order intensity autocorrelations of the SSTF beams may be used to perfect the integrated compressor alignment.

In accordance with other aspects embodiments of the present invention, an optical system is provided. The optical system may include a first optical element or set of optical elements that receives and then varies a pulse-front tilt of a light beam, and a second optical element or set of optical elements that focuses the light beam having the varied pulse-front tilt that is output by the first optical element or set of optical elements.

In some embodiments, the first optical element or set of optical elements includes at least two dihedral optical elements and adjusting a distance between each of the at least two dihedral optical elements and an optical grating varies the pulse-front tilt of the light beam. The light beam may enter and exit each dihedral optical element of the at least two dihedral optical elements only once. In some embodiments the at least two dihedral optical elements are fixed to a common object such as a rail, and a distance between the common object and a first dihedral optical element of the at least two dihedral optical elements is greater than a distance between the common object and a second dihedral optical element of the at least two dihedral optical elements. The optical system may include a roof mirror and an optical grating configured in a manner such that the light beam passes through the optical grating, enters and exits a first dihedral optical element, passes through the optical grating, enters and exits the roof mirror, passes through the optical grating, enters and exits a second dihedral optical element, and then passes through the optical grating. The light beam may enter and exit each dihedral optical element of the at least two dihedral optical elements only once and enter and exit the optical grating only four times. In some embodiments, the first optical element or set of optical elements includes at least two dihedral optical elements and adjusting a distance between the at least two dihedral optical elements varies the pulse-front tilt of the light beam while maintaining a predetermined dispersion compensation. The optical system may allow the pulse-front tilt to be varied independently from a spatial chirp of the light beam. The optical system may further include an interferometer configuration to measure a pulse width of the light beam. The interferometer configuration may include at least one beamsplitter configured to split the light beam prior to the light beam entering the first optical element or set of optical elements. In some embodiments, the focused light ablates a surface of an object.

In accordance with at least some aspects of the present invention a method for varying the pulse-front tilt of a light beam is provided, the method comprising receiving a light beam, varying a pulse-front tilt of the light beam independently from a spatial chirp of the light beam, and focusing the light beam having the varied pulse-front tilt at a focal plane.

In some embodiments, wherein varying a pulse-front tilt of the light beam, a distance between a first dihedral optical element and a grating element is adjusted. Further, adjusting a distance between a second dihedral optical element and the grating element may vary the pulse-front tilt of the light beam. The method for varying the pulse-front tilt of a light beam may further include passing the light beam through an optical grating to a first dihedral optical element, directing the light beam from the first dihedral optical element, through the optical grating, and to a retroreflecting roof mirror, directing the light beam from the retroreflecting roof mirror, through the optical grating, and to a second dihedral optical element, and directing the light beam from the second dihedral optical element, through the optical grating, to an optical element or set of optical elements that focuses the light beam having the varied pulse-front tilt. In some embodiments, the light beam enters and exits each of two dihedral optical elements only once. Further, the pulse width of the light beam may be measured at an interferometer. In some embodiments, the light beam is split into a first light beam and a second light beam prior to at least one of the first light beam, the second light beam, and/or the light beam entering a first optical element or set of optical elements, where the first optical element or the set of optical elements cause the pulse-font tilt to vary.

In accordance with at least some embodiments of the present disclosure, an optical system is provided. The optical system may comprise a first set of optical elements that receives and then varies a pulse-front tilt of a light beam, the first set of optical elements including a first dihedral optical element, a second dihedral optical element, and a retroreflecting roof mirror; a second optical element or set of optical elements that focuses the light beam having the varied pulse-front tilt that is output by the first set of optical elements, wherein, adjusting a distance between the first dihedral optical element and the optical grating and a distance between the second dihedral optical element and the optical grating varies the pulse-front tilt of the light beam.

The Summary is neither intended or should it be construed as being representative of the full extent and scope of the present invention. The present disclosure is set forth in various levels of detail and the Summary as well as in the attached drawings and in the detailed description of the disclosure and no limitation as to the scope of the present disclosure is intended by either the inclusion or non inclusion of elements, components, etc. in the Summary. Additional aspects of the present disclosure will become more readily apparent from the detailed description, particularly when taken together with the drawings.

BRIEF DESCRIPTION OF THE DRAWINGS

The present disclosure is described in conjunction with the appended figures:

FIGS. 2A-C depict various configurations of dihedrals and a roof mirror retroreflector within the variable PFT compressor;

DETAILED DESCRIPTION

The ensuing description provides embodiments only and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Simultaneous spatial temporal focusing (SSTF) has many applications in micromachining, such as improved eye surgery techniques, unique structuring of microfluidic devices, and controllable pulse-front tilt (PFT) (directly applicable to nonreciprocal writing where material modifications may be dependent on scan direction relative to PFT). Formerly SSTF has required a complicated, cascading multi-compressor scheme making it difficult to implement and a challenge for widespread commercial use. In accordance with embodiments of the present disclosure, one or more techniques are provided that simplify the system needed. In addition, such a system/setup allows for controlled and variable PFT, which offers yet another degree of freedom for machining.

Figure 1:
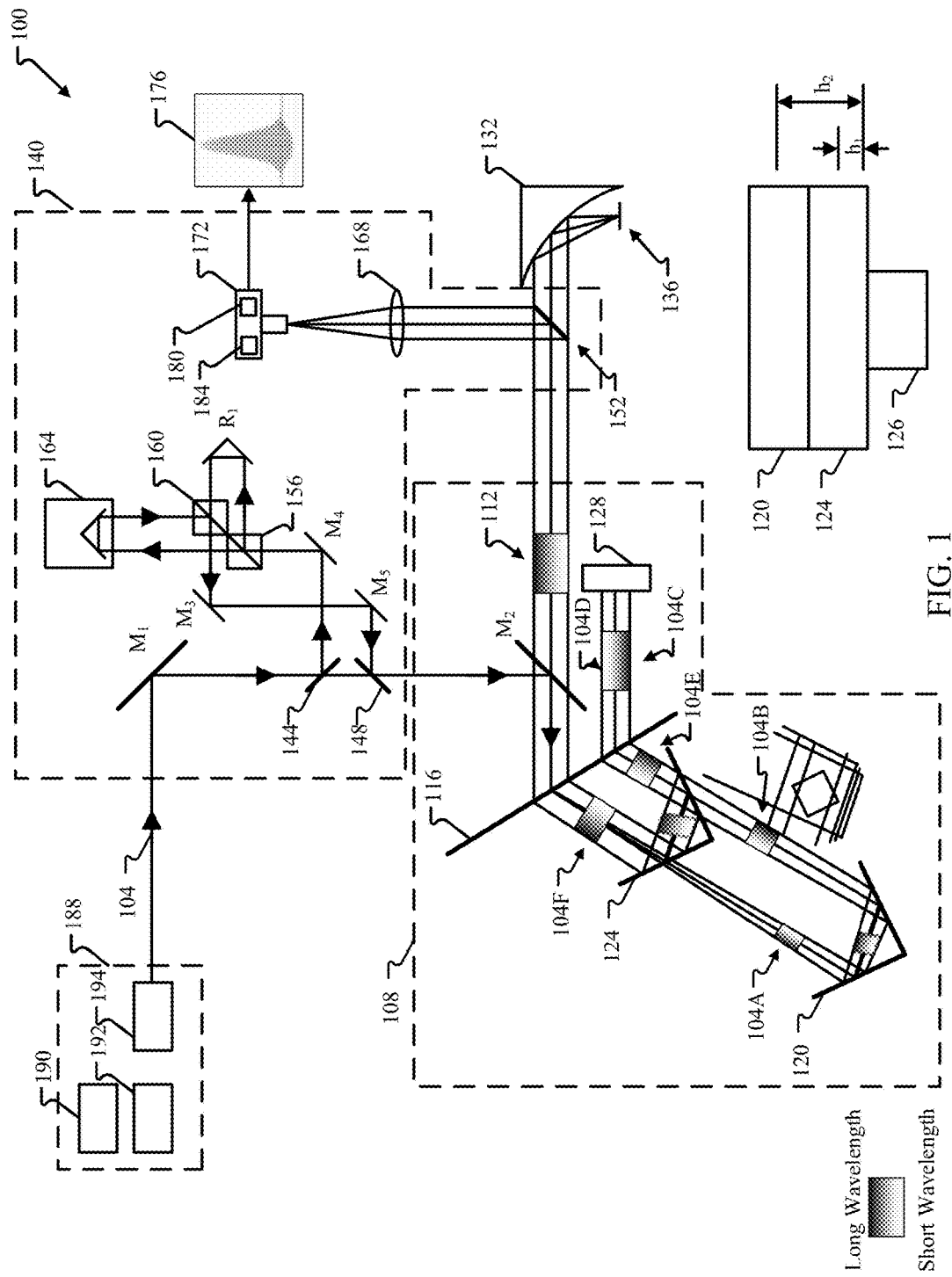
FIG. 1 is a schematic diagram depicting an optical system in accordance with embodiments of the present disclosure.

In accordance with at least one embodiment of the present disclosure, an optical system 100 that allows for a smooth variation of PFT is disclosed. The optical system 100 may include an input light 104 that is provided as an input to a first optical element or set of optical elements 108. The first optical element or set of optical elements 108, also referred to as a compressor, conditions the input light 104 and generates a first output light 112. The first output light 112 is then provided to a second optical element or set of optical elements 132, which focus the first output light at a specific focal point, which may be located on or around a sample 136. As depicted in FIG. 1, three light traces are utilized to show a single light beam passing through the optical system 100. It should be understood that each of the light traces illustrates a differing wavelength of light, with the darker color generally corresponding to a longer wavelength of light and the lighter color generally corresponding to a shorter wavelength of light.

In some embodiments, where the first optical element or set of optical elements 108 includes a set of optical elements, plurality of individual optical elements 116, 120, 124, and 128 may be included in the first optical element or set of optical elements 108. That is, the first optical element or set of optical elements 108 may include a single transmission grating 116, a first dihedral 120, a second dihedral 124, and a roof mirror 128. In this configuration, the PFT results from the geometry of the gratings and the focusing optic; accordingly, the PFT can be precisely controlled and can be routinely achieved across different systems while maintaining a spatially diffraction-limited, and temporally transform-limited focus. Since the beamlets (each frequency component can be treated as its own Gaussian beamlet) are collimated and parallel to each other, there is no transverse chirp at the focal plane, which leads to a coincidence of the temporal and spatial focus. The pulse-front tilt results from the angular spatial chirp rate.

By letting the transverse shift of a beamlet at frequency $\omega$ at the entrance of the lens be $\alpha[\omega-\omega_0]$, where $\omega_0$ is the central frequency and $\alpha$ is a parameter that describes the spatial chirp rate, whose beamlet is traveling along the optical axis (x=0), when focused by a lens of focal length f, the spatial phase is given by Equation 1.

$$\phi(x, \omega) = -\frac{\omega}{c}\frac{\alpha}{f}(\omega - \omega_0)x \quad \text{Equation 1}$$

Here, the negative sign comes from the convention that forward-propagating (toward larger z) positive beam angles travel from −x to +x. The tilt in the pulse front is the variation of the group delay across the focal plane and is provided by Equation 2.

$$PFT = \frac{\partial \tau_g}{\partial x} = \frac{\partial}{\partial x}\left(\frac{\partial \phi}{\partial \omega}\bigg|_{\omega=\omega_0}\right) = -\frac{\alpha}{f}\frac{\omega_0}{c} \quad \text{Equation 2}$$

The PFT can be represented in two alternative forms that help connect the PFT to what may be observed in a lab setting. If $\Delta\omega$ is the $1/e^2$ intensity half width of the spectrum and $\tau=2/\Delta\omega$ is the corresponding half-width pulse duration (note that the corresponding full width at half-maximum is $\tau_{fwhm}=\tau\sqrt{2\ln 2}$, then the numerical aperture of the focusing in the spatial chirp direction is provided by Equation 3.

$$NA_{sc} = \sin\theta_x \approx \frac{\alpha\Delta\omega}{f} \quad \text{Equation 3}$$

Accordingly, the PFT can be reformulated as illustrated in Equation 4.

$$PFT = -\frac{\pi\tau}{\lambda_0}NA_{sc} \quad \text{Equation 4}$$

For a given laser system operating at a central wavelength $\lambda_0$ with a transform-limited pulse duration $\tau$, the PFT depends primarily on the angular spread of the spectrum at the focal plane. Another formulation that illustrates the structure of the tilted pulse front is to make use of the spatial chirp rate $\beta=\alpha\Delta\omega/\omega_{in}$, where $\omega_{in}$ is the $1/e^2$ intensity radius of the input Gaussian beamlet. Note that $\beta$ has a sign that depends on the orientation of the spectrum relative to the x-axis. This ultimately determines the orientation of the tilted pulse front. The PFT can then be described as shown in Equation 5.

$$PFT = \frac{-\beta\tau}{\omega_0} \quad \text{Equation 5}$$

As illustrated in Equation 5, $\omega_0$ is the $1/e^2$ intensity radius of the focal spot. Equation 5 makes it clear that the time taken for the tilted pulse front to cross the full diameter of the beam is $2\beta\tau$.

In accordance with embodiments of the present disclosure, the optical system 100 incorporates an SSTF compressor within a multipass Ti:Al$_3$O$_2$ CPA system. The SSTF compressor doubles as the compressor for the CPA system (a one-step process), also referred to as the optical system 100. As previously described, the optical system 100 includes the first optical element or set of optical elements 108. The first optical element or set of optical elements 108 includes a single transmission grating 116. A non-limiting example of the single transmission grating 116 includes a 130×20 mm clear aperture, G=1200 lines/mm transmission grating. The single grating 116 may have a throughput of 96% at 800 nm, for example, and may be situated at an incident angle of $\theta_i$=31.6 degrees to compensate for third-order dispersion. Of course, other incident angles are contemplated. A suitable type of grating 116 that may be used is manufactured by LightSmyth Technologies.

In addition to the grating 116, the first optical element or set of optical elements 108 may include the first dihedral 120 and the second dihedral 124. The first dihedral 120 and the second dihedral 124 may be right-angle dihedrals and may be mounted on carriages atop a precision dovetail optical rail 126 along the grating's diffracted angle ($\theta_D$=25.9 deg). In general, each dihedral may include one or more mirrors that create a reflective surface such that a right angle exists between the two dihedrals. That is, a right angle exists between each of the reflective surfaces. A suitable type of optical rail 126 that may be used is manufactured by Newport Thorlabs under the model number PRL-36.

The first optical element or set of optical elements 108 may further include a roof mirror 128. The roof mirror 128 may be a right angle roof mirror that retroreflects the beam 104 back through the system 100 at a lower height, for example in a double-pass arrangement. That is, the two dihedrals 120 and 124 on the rail 126 are mounted at different heights $h_2$ and $h_1$ so that upon the first pass through the first optical element or set of optical elements 108 (compressor), the diffracted beam 104A proceeds over the closest dihedral 124 and onto the furthest dihedral 120. The beam 104A then passes through the dihedral 120, and is then redirected through the grating 116 as beam 104B. Once through the grating 116, the beam 104C is directed onto the retroreflecting roof mirror 128 that once again reflects the beam, now 104D, back through the grating 116, emerging as beam 104E and at a different (≈7 mm lower) height. At this new height, the beam 104E now reflects off the second dihedral (D2) as beam 104F and back through the grating 116 as beam 112, exiting the compressor 108 along the input beam path. A pickoff mirror at the new lower height directs the beam 112 to a 1" effective focal length, 90 deg off-axis parabola 132, and 3-axis specimen scanning stages. A suitable type of off-axis parabola 132 that may be used is manufactured by Edmund Optics under part number 47-095. Suitable types of 3-axis specimen scanning stages that may be used are manufactured by Aerotech Inc, under part numbers ANT130-110-XY and ANT130-060-L-Z).

In accordance with certain embodiments of the present disclosure, the first dihedral 120 and the second dihedral 124 are decoupled. That is, adjusting the separation between the first dihedral 120 and the second dihedral 124 along the rail 126 results in variation of the PFT while maintaining the necessary dispersion compensation for the CPA system. As depicted in FIG. 2A, the distances, b1 and b2 are the optical path between the grating 116 and the first dihedral 120, and the grating 116 and the second dihedral 124 respectively. The difference between b1 and b2 is adjusted in order to produce the desired PFT, given by the spectral spread induced by passing through a Treacy grating pair as provided in Equation 6.

$$b_1 - b_2 = f \frac{c}{\lambda_0} \frac{\cos^2\theta}{G\cos\theta_i} PFT \qquad \text{Equation 6}$$

That is, PFT arises if $b_1/b_2 \neq 1$. In accordance with Equation 7, once the PFT is set, $b_2$ and $b_1$ are coupled and translated together to a fixed total length needed to compensate for the overall second order dispersion, $\Phi_2$, of the complete system (post amplifier), where the convention $\theta_D > 0$ is assumed.

$$b_1 + b_2 = \frac{2\pi c^2 \cos^2\theta_D}{\lambda_0^3 G^2} \phi_2 \qquad \text{Equation 7}$$

Thus, the third-order dispersion is provided in Equation 8 and should also be fully compensated if the grating constant G and diffraction order m of the stretcher matches with the SSTF grating.

$$\Phi_3 = -\frac{3\lambda_0}{2\pi c}\left(1 - mG\lambda_0 \frac{\sin\theta_D}{\cos^2\theta_D}\right)\Phi_2 \qquad \text{Equation 8}$$

FIGS. 2A-2C illustrate various configurations of a compressor in accordance with various embodiments of the present disclosure. For variable PFT, and as illustrated in FIG. 2A, the spacing, $b_1$ and $b_2$, of the dihedrals 120 and 124 respectively, varies depending on a desired PFT. The compressor 108 may be arranged to provide a beam aspect ratio ($\beta_{BA}$: the ratio of the spatially chirped-to-beamlet widths) of 10 (PFT≈58,700 fs/mm at focus). Note that the compressor could also be arranged for the first dihedral 120 to pass over the second dihedral 124 ($b_1 < b_2$) in which case it would be possible to tune the PFT through zero to the opposite sign. In accordance with the configuration of FIGS. 1 and 2A, the PFT can be varied independently from 0 to ±x. Moreover, the spatial chirp may be variable from zero to a finite value.

For zero PFT, and as illustrated in FIG. 2B, the second dihedral 124 is removed from the rail 126 while the compressor 204 remains double passed, eliminating spatial chirp and fully compressing the pulse (i.e., a conventional beam). In such a configuration, there is no spatial chirp, no PFT, and no variable PFT. Separate rail carriages for the first dihedral 120 and the second dihedral 124 keep the process of removing dihedrals and/or the roof mirror 128 straightforward. With appropriate optomechanics, it would be possible for the first dihedral 120 and the second dihedral 124 to be stacked in the same plane, $b_1$=$b_2$, thus eliminating the need to remove the second dihedral 124. However, in configurations that are mechanically limited, the second dihedral 124 is removed. Additionally, for maximum PFT, and as illustrated in FIG. 2C, the second dihedral 124 is again removed from the rail 126, but this time the compressor 208 is single passed. That is, the roof mirror 128, similar to the second dihedral 124, is situated on the translation rail 128 and is removed from the beam path. In such a configuration, there is always spatial chirp, the PFT is set, and the PFT is only variable in conjunction with a beam and/or a stretcher system. That is, the PFT cannot be independently varied.

Figure 3:
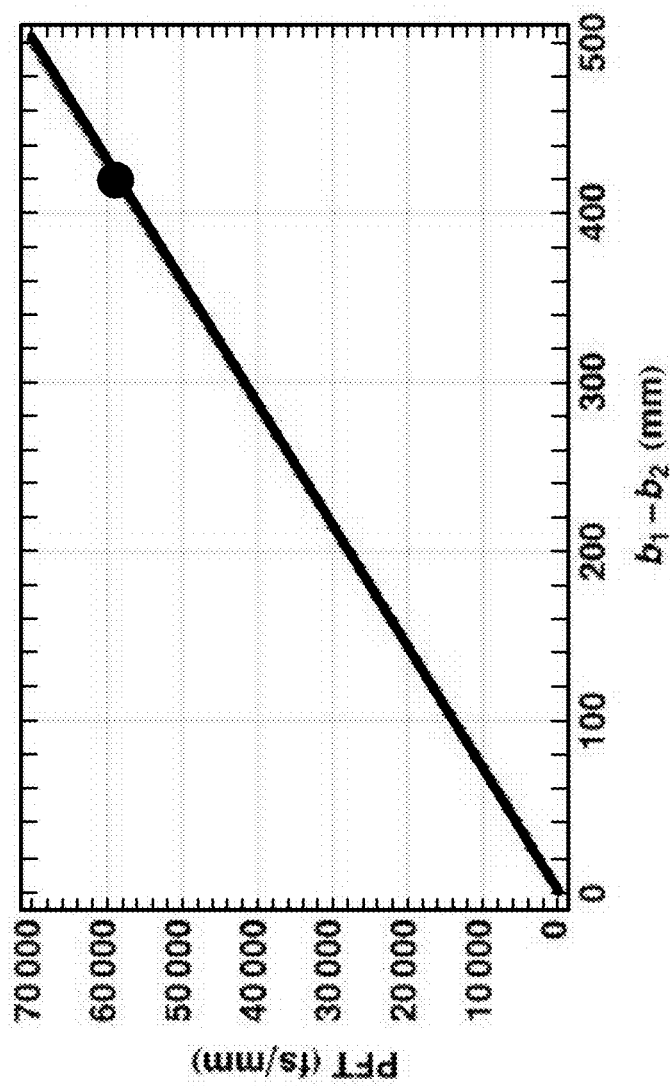
FIG. 3 is a chart depicting PFT as a function of the difference between the dihedral positions.

In accordance with certain embodiments of the present disclosure, FIG. 3 illustrates a plot of PFT as a function of the difference between dihedral (120, 124) positions ($b_1$-$b_2$). As previously described with respect to FIG. 1, a configuration may include f=25.4, G=1200 lines/mm, $\lambda_0$=800 nm, and $\theta_D$=25.9 degrees. Thus, as provided by Equation 6, the PFT may be calculated, and/or experimentally obtained, and is marked by a black circle on FIG. 3.

Ascertaining SSTF pulse widths is complicated by the fact that the pulse width is varying throughout the focus. In accordance with embodiments of the present disclosure, SSTF pulse widths are retrieved utilizing an interferometer 140 that includes a second-order interferometric autocorrelator. The interferometer 140 may include a third optical element or set of optical elements. The interferometer 140 may include flip-up mirrors 144, 148, and 152, beamsplitters 156 and 160, an Optical Delay Line (ODL) 164, one or more lenses 168, and a detector 172. The flip-up mirrors 144 and 148 are placed before the first optical element or set of optical elements 108 and the flip-up mirror 152 is placed before the off-axis parabola 132. A suitable type of OPL 164 that may be used is Mesa Photonic's interferometrically stable Peregrine Optical Delay Line. Such an OPL 164 has ≈1 cm of travel and a resolution of ≈1 fs. A two-beamsplitter design, including beamsplitters 156 and 160, is used to balance each arm of the interferometer 140. To measure the pulse width, the flip-up mirror 144 before the compressor 108 redirects the beam through the interferometer 140 setup. The resulting two collinear pulses are then compressed at the compressor 108 and weakly focused into detector 172 using a long focal length (f=75 cm) lens 168. The detector 172 may be, but is not limited to, a GaAsP diode. Focusing is necessary since only at the focus are all the wavelengths overlapped to produce a short pulse. The long focal length lens 168 helps avoid aberrations that spatially chirped beams are susceptible to when focusing through refractive optics, most notably chromatic aberration. Using this method, an SSTF pulse duration was determined to be 85 fs at focus, assuming a Gaussian pulse shape. An example of an SSTF pulse is illustrated at 176. Further processing of the focused pulse received at the detector 160 may be performed by the detector having processor 180 and memory 184. Alternatively, or in addition, the processor 180 and/or memory 184, alone or in combination, may be incorporated into a stand-alone measurement device.

The input light 104 may be provided by a beam source 188. The beam source 188 may include an oscillator 190, a stretcher 192, and a multiplass amplifier 194. More specifically, an example of the oscillator 190 includes, but is not limited to, a $Ti:Al_2O_3$ oscillator. Additionally, an example of the multipass amplifier 194 includes, but is not limited to, a $Ti:Al_2O_3$ multipass oscillator. The optical system 100 may include additional elements that have not been described in detail. For example, the optical system 100 may include mirrors M and reflectors R used in the compressor 108 and/or the interferometer 140. Such elements may be generally used to direct an input light, such as input light 104, in a desired direction and/or condition the input light, such as input light 104, in a desired manner.

Figure 4A:
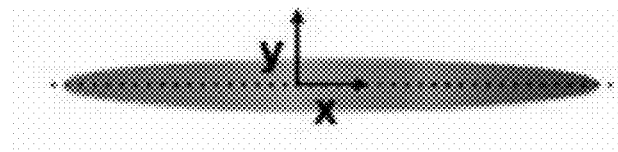
FIGS. 4A-C generally depict well aligned and misaligned compressor dihedrals and further realization of such in an autocorrelation trace.
Figure 4B:
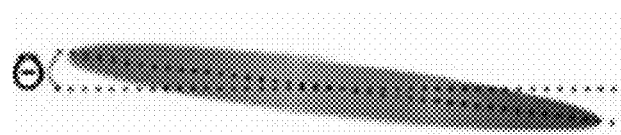
Figure 4C:
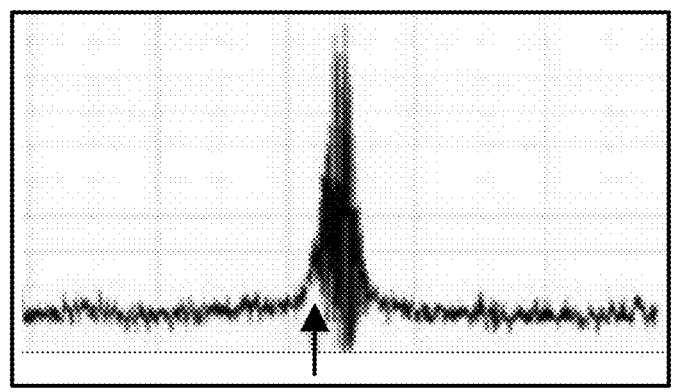

Careful attention must be paid to the alignment of the first dihedral 120 and the second dihedral 124 within the compressor 108. Misalignment of a dihedral's vertical tilt for instance, may result in a skewed beam in the x-y plane. For example, FIG. 4A depicts a well aligned compressor dihedral result in a level SSTF beam in the x-y plane. With regard to FIG. 4B, a misaligned compressor dihedrals results in a tilted SSTF beam in the x-y plane. As depicted in FIG. 4C, a misaligned compressor dihedral may be manifested as an asymmetric artifact (as indicated by the arrow) within the pulse autocorrelation. That is, the misalignment of compressor dihedrals may be realized in an autocorrelation trace, such as trace or SSTF pulse 176, as overt asymmetry. To insure alignment, the near and far-field are considered while translating each dihedral (120 and 124) along the full distance of the rail 126. Once the first dihedral 120 is aligned, the roof mirror 128 may be aligned by looking at the passes through the grating 116 with the unmodelocked oscillator beam. As depicted in FIG. 2A, passes 3 and 4 should be stacked nicely underneath passes 1 and 2 on the grating.

Figure 5:
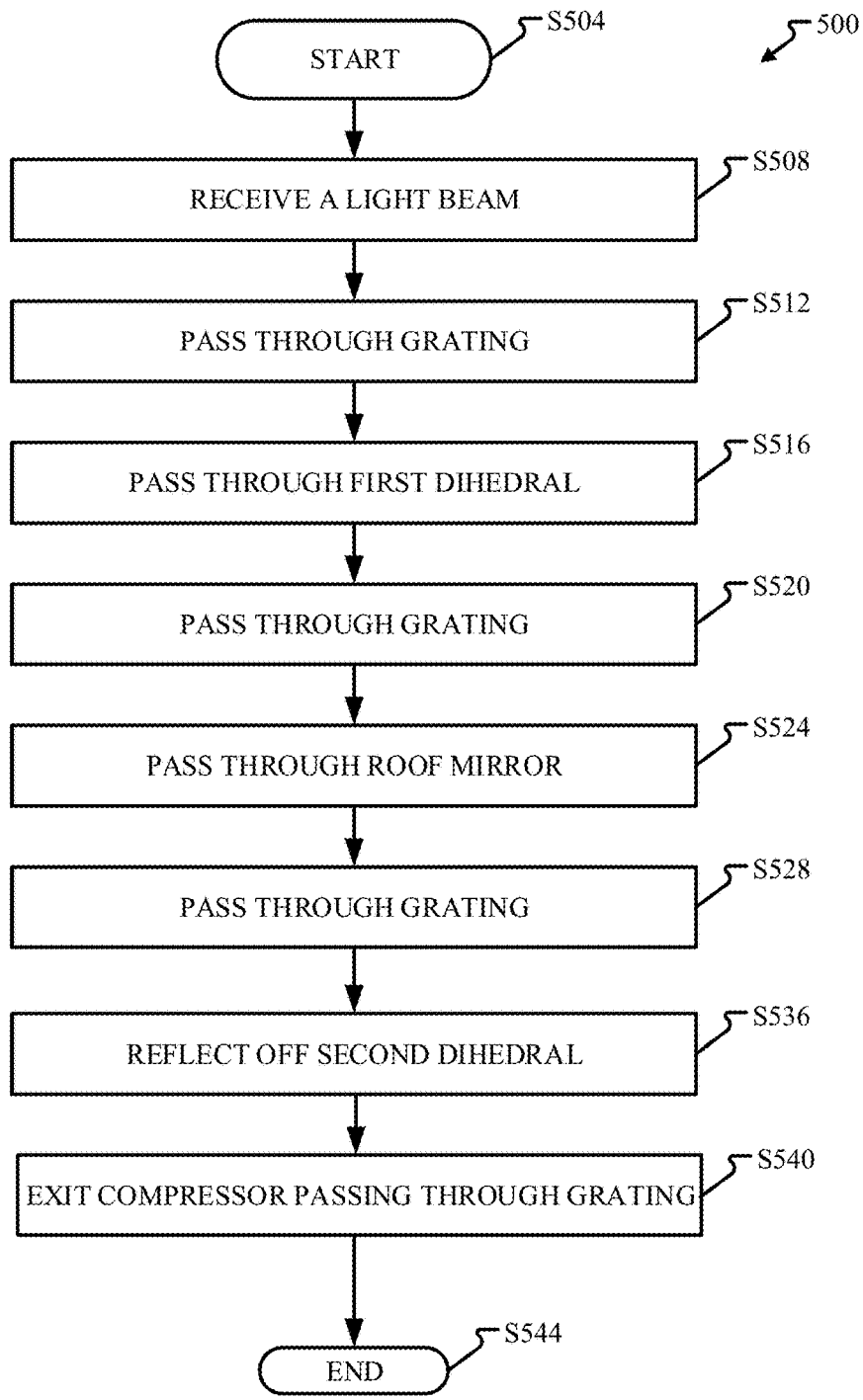
FIG. 5 is a flowchart in accordance with embodiments of the present disclosure.

Referring now to FIG. 5, a method 500 to independently vary PFT will be described in accordance with various embodiments of the present disclosure. Method 500 generally begins at step S504, where a light beam is provided to an optical system, such as optical system 100 as previously described. Such light beam may be received at step S508, where the light beam passes through a grating, such as grating 116, at step S512. The now diffracted light beam proceeds over the closest dihedral 124 and onto the furthest dihedral 120. The light beam then passes through the dihedral 120 at step S516, and is then redirected through the grating 116 a step S520. Once through the grating 116, the light beam is directed onto the retroreflecting roof mirror 128 at step S524 that once again reflects the beam back through the grating 116 at a different (≈7 mm lower) height at step S528. At this new height, the beam now reflects off the second dihedral at step S532 and back through the grating 116, exiting the compressor at step S536 along the input light beam path. Method 500 may end at step S540.

In summary, an optical system 100 design that offers the ability to smoothly vary the PFT has been described. Such optical system 100 may find use in the micromachining and nonreciprocal writing arenas where PFT provides yet another degree of freedom for material modification based on scan direction. Additionally, it may also be of interest for applications requiring no PFT, such as filamentation-based glass-to-glass bonding. Such optical system 100, and more particularly, the flexibility of the compressor design 108, can now allow for both applications to be realized efficiently with a single system and result in uniquely structured and sealed lab on a chip type devices. Finally, the second-order intensity autocorrelations of the SSTF beams may be used to perfect the integrated compressor alignment.

Specific details were given in the description to provide a thorough understanding of the embodiments. However, it will be understood by one of ordinary skill in the art that the embodiments may be practiced without these specific details.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An optical system, comprising:
    a first optical element or set of optical elements that receives and then varies a pulse-front tilt of a light beam, wherein the first optical element or set of optical elements includes at least two dihedral optical elements and adjusting a distance between each of the at least two dihedral optical elements and an optical grating varies the pulse-front tilt of the light beam, wherein the at least two dihedral optical elements are fixed to a common object, and wherein a distance between the common object and a first dihedral optical element of the at least two dihedral optical elements is greater than a distance between the common object and a second dihedral optical element of the at least two dihedral optical elements; and
    a second optical element or set of optical elements that focuses a light beam having the varied pulse-front tilt that is output by the first optical element or set of optical elements.

2. The optical system of claim 1, wherein the light beam enters and exits each dihedral optical element of the at least two dihedral optical elements only once.

3. The optical system of claim 1, further including a roof mirror and an optical grating, wherein the light beam passes through the optical grating, enters and exits the first dihedral optical element, passes through the optical grating, enters and exits the roof mirror, passes through the optical grating, enters and exits the second dihedral optical element, and then passes through the optical grating.

4. The optical system of claim 3, wherein the light beam enters and exits each dihedral optical element of the at least two dihedral optical elements only once and enters and exits the optical grating only four times.

5. The optical system of claim 1, wherein adjusting a distance between the at least two dihedral optical elements varies the pulse-front tilt of the light beam while maintaining a predetermined dispersion compensation.

6. The optical system of claim 1, wherein the pulse-front tilt is varied independently from a spatial chirp of the light beam.

7. The optical system of claim 1, further comprising an interferometer configuration to measure a pulse width of the light beam, wherein the interferometer configuration includes at least one beamsplitter configured to split the light beam prior to the light beam entering the first optical element or set of optical elements.

8. The optical system of claim 1, wherein the second optical element or set of optical elements outputs focused light that ablates a surface of an object.

9. A method, comprising:
receiving a light beam;
varying a pulse-front tilt of the light beam independently from a spatial chirp of the light beam by:
passing the light beam through an optical grating to a first dihedral optical element;
directing the light beam from the first dihedral optical element, through the optical grating, and to a retroreflecting roof mirror;
directing the light beam from the retroreflecting roof mirror, through the optical grating, and to a second dihedral optical element; and
directing the light beam from the second dihedral optical element, through the optical grating, to an optical element or set of optical elements that focuses the light beam having the varied pulse-front tilt; and
focusing the light beam having the varied pulse-front tilt at a focal plane.

10. The method of claim 9, wherein varying the pulse-front tilt of the light beam includes adjusting a distance between the first dihedral optical element and the optical grating.

11. The method of claim 10, wherein varying the pulse-front tilt of the light beam includes adjusting a distance between the second dihedral optical element and the optical grating.

12. The method of claim 9, wherein the light beam enters and exits each of two dihedral optical elements only once.

13. The method of claim 9, further comprising measuring a pulse width of the light beam at an interferometer.

14. The method of claim 9, further comprising splitting the light beam into a first light beam and a second light beam prior to at least one of the first light beam, the second light beam, and/or the light beam entering the first dihedral optical element.

15. The method of claim 14, wherein a second optical element or second set of optical elements cause the pulse-front tilt to vary, and wherein the second optical element or second set of optical elements include the optical grating, the first dihedral optical element, the second dihedral optical element, and the retroreflecting roof mirror.

16. An optical system, comprising:
a first set of optical elements that receives and then varies a pulse-front tilt of a light beam, the first set of optical elements including:
a first dihedral optical element,
a second dihedral optical element, wherein the first dihedral optical element and the second dihedral optical element are fixed to a common object, and wherein a distance between the common object and the first dihedral optical element is greater than a distance between the common object and the second dihedral optical element, and
a retroreflecting roof mirror; and
a second optical element or set of optical elements that focuses the light beam having the varied pulse-front tilt that is output by the first set of optical elements,
wherein adjusting a distance between the first dihedral optical element and an optical grating and a distance between the second dihedral optical element and the optical grating varies the pulse-front tilt of the light beam, and
wherein the light beam includes femtosecond laser pulses.

* * * * *